(12) United States Patent
Ghosh et al.

(10) Patent No.: US 11,106,496 B2
(45) Date of Patent: Aug. 31, 2021

(54) MEMORY-EFFICIENT DYNAMIC DEFERRAL OF SCHEDULED TASKS

(71) Applicant: MICROSOFT TECHNOLOGY LICENSING, LLC, Redmond, WA (US)

(72) Inventors: Priyadarshi Ghosh, Bangalore (IN); Srihari Narasimhan, Bangalore (IN); Shyam Arunkundram Ramprasad, Bangalore (IN)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 16/557,050

(22) Filed: Aug. 30, 2019

(65) Prior Publication Data
US 2020/0379801 A1 Dec. 3, 2020

(30) Foreign Application Priority Data

May 28, 2019 (IN) .............................. 201941021057

(51) Int. Cl.
| | |
|---|---|
| *G06F 9/46* | (2006.01) |
| *G06F 9/48* | (2006.01) |
| *G06F 8/41* | (2018.01) |
| *G06F 9/38* | (2018.01) |
| *G06F 9/50* | (2006.01) |

(52) U.S. Cl.
CPC .......... *G06F 9/4881* (2013.01); *G06F 8/4434* (2013.01); *G06F 9/3851* (2013.01); *G06F 9/5038* (2013.01)

(58) Field of Classification Search
CPC .... G06F 9/4881; G06F 8/4434; G06F 9/3851; G06F 9/5038
See application file for complete search history.

(56) References Cited

U.S. PATENT DOCUMENTS

| | | | | |
|---|---|---|---|---|
| 4,251,863 | A | * | 2/1981 | Rothenberger ..... G06F 11/1024 714/54 |
| 4,275,413 | A | * | 6/1981 | Sakamoto ............ H04N 1/6025 358/525 |

(Continued)

FOREIGN PATENT DOCUMENTS

CN 101290588 B 6/2010

OTHER PUBLICATIONS

"Bit Array—Wikipedia", Retrieved From: https://en.wikipedia.org/w/index.php?title=Bit_array&oldid=669388045, Jun. 30, 2015, 8 Pages.

(Continued)

*Primary Examiner* — Adam Lee
(74) *Attorney, Agent, or Firm* — NovoTechIP International PLLC

(57) ABSTRACT

Dynamic deferral systems and methods providing a means to defer performance of a task for a distributed computing system entity both by the number of work cycles as well as in response to an occurrence of a triggering event. By deferring the scheduling in terms of the number of workcycles, the memory footprint is reduced as the scheduling matrix uses only one byte to store the number. This approach also takes advantage of the most significant bit of a byte to indicate whether the scheduled job is to be evoked in response to a triggering event.

16 Claims, 9 Drawing Sheets

(56) References Cited

U.S. PATENT DOCUMENTS

| | | | |
|---|---|---|---|
| 4,447,874 A * | 5/1984 | Bradley | G06F 9/463 |
| | | | 711/E12.097 |
| 4,718,090 A * | 1/1988 | Cooper, Jr. | G06K 9/4638 |
| | | | 382/204 |
| 5,602,826 A * | 2/1997 | Yoshimura | H04Q 11/0478 |
| | | | 370/241.1 |
| 6,356,277 B1 * | 3/2002 | Yajima | G06F 7/509 |
| | | | 345/603 |
| 8,954,985 B2 | 2/2015 | Edelstein et al. | |
| 2002/0150100 A1 * | 10/2002 | White | H04L 47/36 |
| | | | 370/392 |
| 2003/0179774 A1 * | 9/2003 | Saidi | H04L 47/525 |
| | | | 370/468 |
| 2004/0131088 A1 * | 7/2004 | Moore | H04J 3/12 |
| | | | 370/523 |
| 2005/0015767 A1 * | 1/2005 | Nash | G06F 9/4887 |
| | | | 718/102 |
| 2005/0024299 A1 * | 2/2005 | Abe | G09G 3/3275 |
| | | | 345/76 |
| 2005/0149931 A1 * | 7/2005 | Lin | G06F 9/30145 |
| | | | 718/100 |
| 2006/0026314 A1 * | 2/2006 | Franchuk | H04L 12/4135 |
| | | | 710/58 |
| 2006/0077947 A1 * | 4/2006 | Kim | H04L 1/0057 |
| | | | 370/349 |
| 2006/0112390 A1 * | 5/2006 | Hamaoka | G07C 9/00571 |
| | | | 718/102 |
| 2007/0083866 A1 | 4/2007 | Mani et al. | |
| 2007/0147429 A1 * | 6/2007 | Shi | H04N 5/76 |
| | | | 370/473 |
| 2008/0209284 A1 * | 8/2008 | Louie | G11C 29/1201 |
| | | | 714/718 |
| 2009/0070762 A1 | 3/2009 | Franaszek et al. | |
| 2010/0083289 A1 * | 4/2010 | Peng | G06F 9/547 |
| | | | 719/330 |
| 2010/0194421 A1 * | 8/2010 | Iwamoto | G01R 31/31919 |
| | | | 324/750.3 |
| 2010/0290414 A1 * | 11/2010 | Yamada | H04W 16/14 |
| | | | 370/329 |
| 2012/0079486 A1 * | 3/2012 | Brandt | G06F 9/4887 |
| | | | 718/102 |
| 2012/0278591 A1 * | 11/2012 | Hilker | G06F 9/30032 |
| | | | 712/208 |
| 2015/0143281 A1 * | 5/2015 | Mehta | G06Q 10/10 |
| | | | 715/781 |
| 2015/0202969 A1 * | 7/2015 | Terayama | G06F 9/542 |
| | | | 700/275 |
| 2017/0060629 A1 * | 3/2017 | Vora | G06F 9/4881 |
| 2017/0123795 A1 * | 5/2017 | Chen | G06F 9/30127 |
| 2017/0147400 A1 * | 5/2017 | Achouche | G06F 9/54 |
| 2020/0008123 A1 * | 1/2020 | Xhafa | H04L 45/026 |

OTHER PUBLICATIONS

Krishnamurthy, et al., "Yeast: A General Purpose Event-Action System", in Journal of IEEE Transactions on Software Engineering, vol. 21, Issue 10, Oct. 1995, pp. 845-857.

"Invitation to Pay Additional Fees Issued in PCT Application No. PCT/US2020/029028", dated Jun. 23, 2020, 09 Pages.

"Chapter 15—Keeping Time, Scheduling Tasks, and Launching Programs", Retrieved from https://web.archive.org/web/20190629140821/https:/automatetheboringstuff.com/chapter15/, Jun. 29, 2019, 26 Pages.

"Repeating a Task", Retrieved from https://docs.microsoft.com/en-us/windows/win32/taskschd/repeating-a-task, May 31, 2018, 2 Pages.

"Scheduling Jobs with Oracle Scheduler", Retrieved from https://web.archive.org/web/20170226153839/https:/docs.oracle.com/cd/E11882_01/server.112/e25494/scheduse.htm, Feb. 26, 2017, 45 Pages.

Park, Steve, "SAP Event Driven Batch Job" Retrieved from http://www.dataxstream.com/2010/03/sap-event-driven-batch-job/, Mar. 4, 2010, 7 Pages.

Sutar, Abhijeet, "How to Schedule a Task to Run in an Interval", Retrieved from https://dzone.com/articles/how-schedule-task-run-interval, Apr. 3, 2014, 4 Pages.

"International Search Report and Written Opinion Issued in PCT Application No. PCT/US20/029028", dated Aug. 13, 2020, 15 Pages.

* cited by examiner

| MON | TUE | WED | THU | FRI | SAT | SUN |
|---|---|---|---|---|---|---|
| NO TRANSACTION | 23 NO TRANSACTION *AUDIT PERFORMED* | NO TRANSACTION | ① 25 NO TRANSACTION | NO TRANSACTION *AUDIT PERFORMED* | NO TRANSACTION | NO TRANSACTION |
| NO TRANSACTION 220 | 30 NO TRANSACTION *AUDIT PERFORMED* | NO TRANSACTION | 1 NO TRANSACTION | NO TRANSACTION | NO TRANSACTION *AUDIT PERFORMED* | NO TRANSACTION |
| NO TRANSACTION | 6 NO TRANSACTION 240 | NO TRANSACTION *AUDIT PERFORMED* | 8 NO TRANSACTION | NO TRANSACTION | NO TRANSACTION 250 | NO TRANSACTION *AUDIT PERFORMED* |
| NO TRANSACTION | 13 NO TRANSACTION | NO TRANSACTION 260 | 15 NO TRANSACTION *AUDIT PERFORMED* | ② NO TRANSACTION | NO TRANSACTION *AUDIT PERFORMED* | NO TRANSACTION 298 |
| NO TRANSACTION | 20 NO TRANSACTION | NO TRANSACTION *AUDIT PERFORMED* 270 | 22 NO TRANSACTION | NO TRANSACTION 296 | NO TRANSACTION | NO TRANSACTION *AUDIT PERFORMED* 280 |

FIG. 2

MEMORY-EFFICIENT DYNAMIC DEFERRAL OF SCHEDULED TASKS

CROSS-REFERENCE TO RELATED APPLICATION

This application claims the benefit of priority to a provisional patent application under 35 U.S.C. § 119 to India Patent Application Serial Number 201941021057, filed on May 28, 2019 and entitled "Memory-Efficient Dynamic Deferral of Scheduled Tasks," the entirety of which is incorporated by reference herein in its entirety.

BACKGROUND

Conventional methods for performing large-scale computational jobs often required a user to rely on statically generated task execution schedules. In addition, these schedules depend on the expenditure of memory resources that help maintain records of occurrences of a task in the distributed environment and to manage queues for the jobs. Thus, there remain significant areas for new and improved ideas for the efficient and effective scheduling of jobs.

SUMMARY

A data processing system according to first aspect of the disclosure includes a processor and computer readable media. The computer readable media includes instructions which, when executed by the processor, cause the processor to: receive a first indication that a first job to be performed in a distributed computing environment is dynamically deferred until a triggering event occurs; detect a first occurrence of the triggering event during a first work cycle; and initiate, in response to detecting the first occurrence of the triggering event, a first performance of the first job during a second work cycle that immediately follows the first work cycle.

A method according to a second aspect of the disclosure includes receiving a first indication that a first job to be performed in a distributed computing environment is dynamically deferred until a triggering event occurs; detecting a first occurrence of the triggering event during a first work cycle; and initiating, in response to detecting the first occurrence of the triggering event, a first performance of the first job during a second work cycle that immediately follows the first work cycle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 2 is a conceptual diagram illustrating a calendar showing one example of a dynamic task execution schedule;

DETAILED DESCRIPTION

Figure 1:
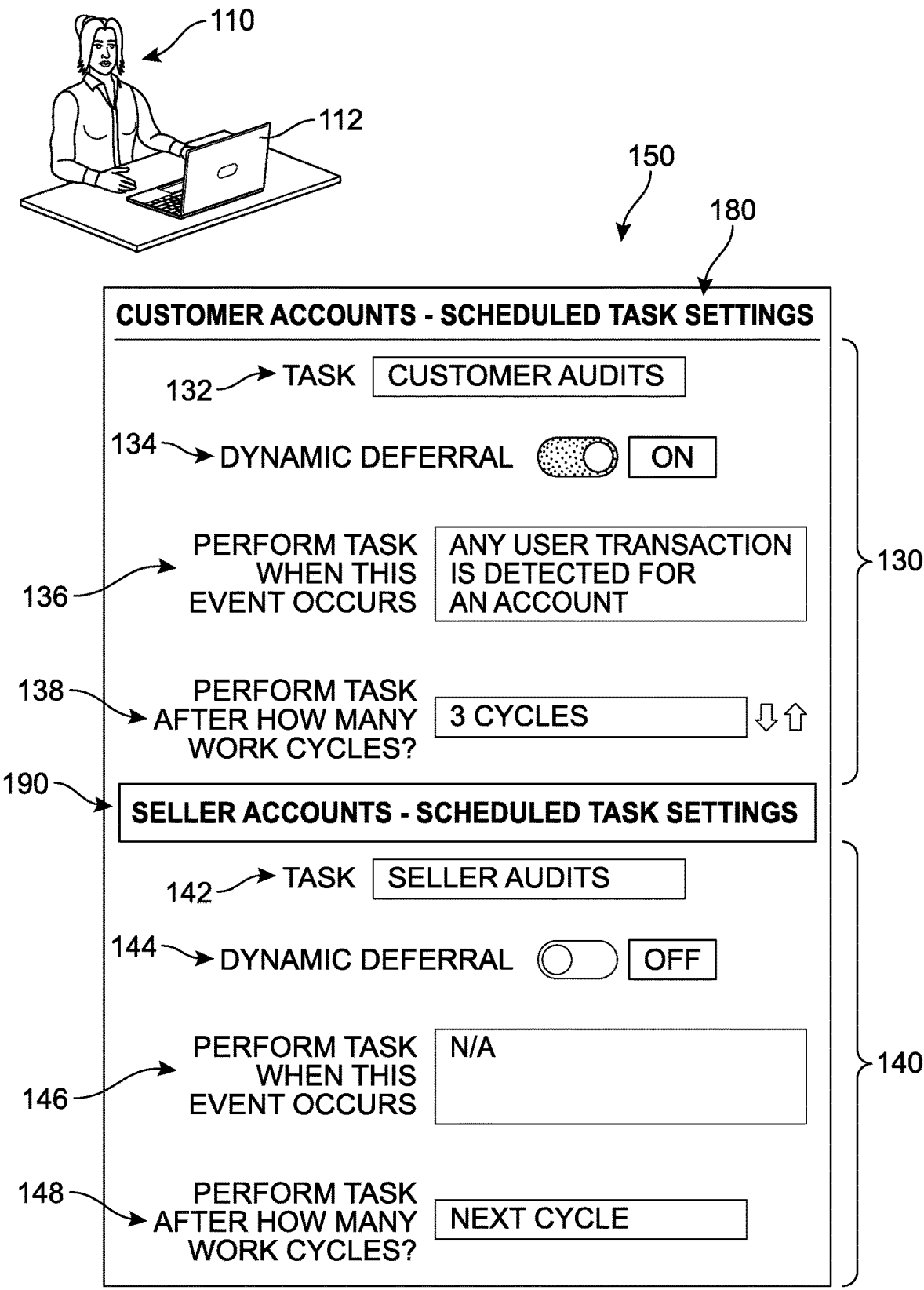
FIG. 1 illustrates an implementation of a user interface for modifying a task execution schedule.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following implementations introduce a system and method for allocating job execution resources that promote the efficient use of memory in a computing system while ensuring the tasks continue to be performed at the desired times. This approach—referred to herein as dynamic deferral—allows jobs that are to be performed in a distributed computing environment to be scheduled to occur in response to triggering events, or events that have been designated to be of significance with respect to the entity being serviced. As one example, a scheduled job that has a work-cycle of 24 hours is configured to process all mailboxes in a data-center, as well as clean up metadata associated with the mailbox. However, if the mailbox remains inactive, there is no need for this task to occur. By implementation of the disclosed method, the scheduled job can be deferred until a triggering event occurs. Thus, in this example, the task can remain disabled or dormant during the interval in which the mailbox is inactive, and conversely, the task can be 'awakened' or enabled when any mailbox activity occurs. In some implementations, the dynamic deferral approach can work in conjunction with the scheduling approach, such that the task is performed following an interval of time (e.g., 10 days), which is indicated by the scheduled task itself, if there continues to be no activity detected for the mailbox. Furthermore, if a triggering event (here, any activity in the mailbox) occurs at any point during those 10 days, the task will also be initiated.

The proposed implementations are also configured to provide a more efficient use of memory with respect to the execution of such tasks. As will be described in greater detail below, a task manager can maintain a matrix where each cell of the matrix is only one byte, and the most significant bit (MSB) represents whether execution of a scheduled job is to be based on the occurrence of an event, while the remaining seven bits represent the number of work-cycles that the task should be otherwise deferred (i.e., in the case that no triggering event occurs). The MSB is normally the left-most bit in the byte arrangement, sequence or binary representation. Thus, the MSB is set to 1 if dynamic deferral has been enabled for this task, and set to 0 if dynamic deferral has been disabled. The remaining seven bits then serve to indicate the number of work-cycles to 'skip' until the task should be performed again. In one implementation, the maximum value that may be represented by the seven bits will be 127. If execution of the task is intended to occur only when a triggering event occurs, the seven bits are all set to 1, thereby indicating that the scheduled job should not be performed at all until a triggering event occurs.

For purposes of clarity, some terms are described herein for the reader. As a general matter, an account will refer to a global uniquely identified entity within a distributed computing environment. In some implementations, all of the resources and tasks discussed herein are accessible through a user account. Typically, a user initially creates an account before using the resources of a computing system. After creating the account, the user can use the account to submit work items to the system and manage resources for performing jobs based on the work items.

In addition, a work item can refer to a static representation of a job to be run in the distributed computing environment. A work item can specify various aspects of a job, including job binaries, pointers to the data to be processed, and optionally the command line to launch tasks for performing the job. In addition, a work item may specify parameters of a recurring schedule, priority tasks, and constraints. For example, a recurring work item can be specified for launch every day at 5 PM. In such cases, a job may be understood to represent a running instance of a work item. Thus, a job contains a collection of tasks that work together to perform a distributed computation. The tasks can run on one or more virtual machines in the distributed computing environment. A task can be understood to refer to the fundamental execution unit of a job. A task is typically executed by a virtual machine within a task tenant (also referred to as a task machine). Users can specify additional input to the command line and pointers to input data for each task. A task may create a hierarchy of files under its working directory on the virtual machine performing the task during the course of execution of the task. Thus, as a general matter, a job is a running instance of a work item. The job can be comprised of a plurality of tasks, such as a first task, second task, third task, etc. In some implementations, a job can also be comprised of a job task manager that can serve as a single control point for all of the other tasks within the job. In other words, a work item may be understood to represent a static representation of a job. The work item will be referred to as a job once the resource of the distributed computing system initiates computational resources (such as but not limited to, loading the job, queuing the job, instantiating tasks within the job, etc.). Thus, a work item becomes a job once the system begins processing the work item.

In addition, a virtual machine generally refers to a logical unit of processing capability. In different implementations, a virtual machine can have a one to one correspondence with a physical processor, or a virtual machine can correspond to a plurality of processors, or a virtual machine can represent a percentage of processing time/cycles on one or more processors. In some cases, references to a computing device should be understood to encompass a virtual machine. The virtual machines, which may perform a job based on a work item, can be associated with the account for the work item prior to use. Furthermore, a pool refers to a logical grouping of virtual machines. In different implementations, a pool may have allocated virtual machines spanning different data centers, different geographic locations, and/or different physical configurations.

In one implementation, a work item will have at least one associated pool to run the job(s) corresponding to the work item. Each account (e.g., task account) can create one or more pools to which the account gets exclusive access for use in performing work items associated with the account. A pool can be created when a work item is submitted by a user, or a work item can be associated with an existing pool. Optionally, a pool can be associated for use with a single work item or another subset of the work items corresponding to an account. In some implementations, a pool may be automatically created by the system for a job. For example, a recurring work item may run every day at a particular time and usually require two hours to complete. In this example, a pool may be automatically created every day when the job is created and the pool may be deleted when the job completes.

In some implementations, when a work item is submitted by a user, the work item can be associated with one or more pools of virtual machines. In one implementation, the work item may be exclusively associated with a single pool (and/or multiple work items or jobs may be associated with a common pool). The virtual machines can be organized within a pool in any convenient manner. For example, all virtual machines may be organized in a single pool regardless of the geographic location of the underlying processor for the virtual machine. Another option is to organize virtual machines based on geographic location, so that all virtual machines for a pool are in a given geographic location. Still another option is to organize virtual machines on a basis other than geographic location, such as proximity to other variables (e.g., storage resource, network latencies, user location/preference, and security requirements, etc.).

In another implementation, a pool is formed utilizing system resources to automatically generate the pool. The auto pool creation allows a pool to be created automatically by the system when either a work item is created or when a job itself is created. This process abstracts the creation of the pool from the customer/user/client. In some implementations, the pool is automatically created when running the job and the pool is automatically disabled or discarded when the job has finished. In some other cases, the pool is automatically created when the work item is created and the pool is automatically disabled or discarded when the work item is deleted or finished.

In different implementations, a virtual machine may run one task and/or many tasks. In some implementations, multiple jobs may run on the same virtual machine (VM) pool. The VM pool may grow and shrink in size automatically without user intervention and without explicit handling from the jobs; for example, a job may not be responsible for compensating for the expansion or shrinkage of a pool. Similarly, in some implementations, a job may span multiple pools. This spanning of multiple pools may be achieved by load balancing the job across multiple pools that are able to independently grow and shrink in VM resources. In one implementation, a pool may be comprised of zero virtual machines at a given time. This may occur when there are no tasks for the job to perform. As a result, a pool may shrink down to zero VMs during a period of time to save computational resources.

In order to better introduce the systems and methods to the reader, FIG. 1 presents an example of a representative job scheduling user environment for implementing a dynamic deferral execution feature (the system is illustrated schematically in greater detail in FIG. 5 below). In different implementations, the environment can include a computing device end-user, or simply "user" 110 who can interact with a scheduling resources interface ("scheduling interface") 150 via a computing device ("device") 112. It can be understood that the device 112 is configured for connection to a network.

In this example, various scheduling options can be viewed and configured via a native control, such as the scheduling interface 150, which can provide access to features and resources associated with a job scheduling application ("application"). Generally, a "native control" can be understood to refer to a mechanism for communicating content through a client application to an application user. For example, native controls may include pop-up windows that may be presented to a user as software application user interfaces (UIs), interactive buttons, or other objects that may be shown to a user through native application UIs, as well as mechanisms that are native to a particular application for presenting associated content with those native controls. In different implementations, a native control can include any other type of user interface such as a dialog box, notification, alert, reminder, email, instant message, or other application communication or presentation means. In addition, a "trigger event" or "triggering event" refers to an event (or specific sequence of events) associated with a particular use of an application, which corresponds to a selection of an option offered via a native control, or an event that matches a condition. In FIG. 1, the triggering event may be understood to include a 'click', toggle, voice command, or other input actions (such as a mouse left-button or right-button click, a touchscreen tap, a selection of data, or other input types).

As will be described below, in different implementations, the scheduling interface 150 can include a plurality of fields for receiving job-related input, including but not limited to a task title or subject field, a dynamic deferral enablement field, an event field, and/or a frequency field. In some implementations, the application can be configured to present additional or alternate options to a user. It should be understood that Settings and/or Preferences option(s) may be made available on each of the user interfaces described herein, whether or not explicitly identified.

As user 110 initially schedules and/or views the job schedule via the scheduler interface 150, the user 110 may be presented with a first selectable option ("first option") 190 to enable dynamic deferral for the job they are currently viewing. As will be described in greater detail below, dynamic deferral refers to a process by which a scheduled job can be configured to run where the recurrence of the job (or task) is based not on the number of work-cycles after which it should be run again but in response to the occurrence of a particular event or type of event. In other words, while a static job schedule is a process that is configured to occur after every work-cycle, a dynamic job schedule is a process that is configured to occur following or in response to the occurrence of what will be referred to as a "triggering event". It should be understood that dynamic job schedules can also incorporate or include job cycles, wherein a job is scheduled to occur after a work-cycle timespan defined by the job itself, but also functions with an option to execute when a triggering event predefined by the scheduled job occurs. In general, a "work-cycle" can refer to a timespan after which a scheduled job is run for an entity; thus, each scheduled job will be understood to have its own work-cycle. Furthermore, a "triggering event" may refer to a set of event types that have been selected or defined for a scheduled job, e.g., by application of a set of filters that will be applied to each event. The triggering events can be entity-created or entity-updated.

In the example of FIG. 1, the user 110 is interested in modifying a schedule for work items associated with an entity such as an e-commerce website. In some cases, the entity can expect a scheduled job to run on all of its accounts once every day (or other period of time corresponding to one work cycle). As an example, the scheduled job can refer to an audit of all transactions that have taken place that day involving the website. However, in some implementations, some accounts may not be typically subject to regular levels of activity, and such daily audits are both unnecessary and inefficient. For example, the audit (or any other scheduled job) need not be run on days that there is no activity in the user (e.g., the account is inactive). Thus, for some accounts, the entity may recognize a statically-driven scheduling approach is a drain of computing resources, time, and memory.

In FIG. 1, the user 110 is able to view two types of user account scheduling menus, including a customer accounts menu 180 and a seller accounts menu 190. With respect to the customer accounts menu, a first task field 132 can be selected or filled (in this case shown as "customer audits"), and a first option 134 is in an "ON" mode as a result of the user's selection of the option, thereby enabling or activating the dynamic deferral functionality. It should be understood that a user may also deactivate the option by switching the first option 134 back to the OFF position. However, in other implementations, the application may present the user with the dynamic deferral function already activated, as a default, and the user can disable the option if desired. As a result of activating the first option 134, a first input field 136 is also activated ("Perform task when this event occurs"), by which the user 110 can define or identify (for example, from a drop-down menu or directory of predefined events) the triggering event that should trigger the initiation of the task that was selected in first task field 132. In this case, the user 110 has indicated that the task be performed whenever "any user transaction is detected for an account". Furthermore, as noted earlier, in some implementations, the dynamically deferred task can also be subject to a schedule dependent on a number of cycles passing, as represented by a first performance frequency field 138 ("Perform task after how many work cycles?"), configured to request execution of the designated task at specified intervals. In this case, the user 110 has selected 3 cycles. This means that after three cycles have passed, a task is scheduled to occur (on the $4^{th}$ cycle). It should be understood that the first performance frequency field 138 need not be selected or the frequency can be zero, such that execution of the task is solely based on dynamic deferral.

For purposes of comparison, a statically configured job scheduling approach is also depicted below with respect to the seller accounts menu 190, where a second task field 142 can be selected or filled (in this case shown as "seller audits"), and a second option 144 is in an "OFF" mode as a result of the user's selection of the option, thereby disabling or deactivating the dynamic deferral functionality. As a result of deactivating the second option 144, a second input field 146 is also deactivated ("Perform task when this event occurs"), while a second performance frequency field 148 ("Perform task after how many work cycles?"), configured to request execution of the designated task at specified intervals, remains available, but is limited to only one choice corresponding to "next cycle", indicating instructions that the audit occur at the conclusion of every work-cycle associated with the seller account(s). Thus, in some implementations, execution of the task may be configured to occur following each work-cycle (statically). A user can thereby consider and define the logistics of the scheduled job, and make a choice as to what type of schedule is needed, how often the job should be performed, and whether the job should automatically occur upon occurrence of one or more specified events.

It should be understood that the text and specific wording shown in the figures are for purposes of illustration only and in no way limit the manner by which the application may communicate or receive information. In addition, it should be understood that in other implementations, the various options or other fields may appear differently and/or may be displayed or generated anywhere else on the screen(s) associated with the client's system, including spaced apart from, adjacent to, or around the scheduler user interfaces. In other words, the figures present only one possible layout of the interface, and do not in any way limit the presentation arrangement of any of the disclosed features.

Referring next to FIG. 2, a calendar 200 is presented in a monthly view, with the days of the week shown above. The calendar 200 includes a plurality of segments, blocks, or boxes, each of which represent one day. For purposes of clarity, FIG. 2 should be understood to make reference to the example described in FIG. 1, where the user had scheduled a recurring task (customer audits) to occur cyclically, after three work cycles or every four days, as well as in response to any user transaction detected for a customer account. Thus, the calendar 200 represents a hybrid schedule where execution of the task is scheduled to occur regularly at specified intervals as well as in response to the occurrence of a specified event. While the work-cycle is represented as a daily interval (24 hour cycle) in this example, it is to be understood that work-cycles may comprise any other period of time (e.g., weekly, bi-weekly, monthly, semi-annually, yearly, etc.).

With respect to the tasks occurring following a particular number of cycles, a plurality of cyclically occurring tasks 202 can be observed as occurring every four days (with three full cycles in which the job is not executed in-between, and the task then being executed on the fourth day). In this example, the task is executed on a first date 210, a second date 220, a third date 230, a fourth date 240, a fifth date 250, a sixth date 260, a seventh date 270, and an eighth date 280. These audits are performed every four days as long as three cycles directly prior to the execution were not associated with the occurrence of any other execution of the same task (non-performance cycles). The task can occur on other dates if in response to detection of a triggering event. For example, in FIG. 2, the dynamically deferred execution of the task is also observed on those days following the occurrence of a transaction. Thus, as a transaction occurred on a ninth date 290, an audit was performed in the next (directly subsequent) cycle (here, at a tenth date 292). Similarly, as two transactions occurred on an eleventh date 296, another audit was performed in the next (directly subsequent) cycle corresponding to a twelfth date 298.

In some implementations, depending on the arrangement of the schedule, in some implementations, the task may be performed more immediately and follow each instance of the triggering event. Thus, in one implementation, during the same work cycle in which the triggering event occurred, the corresponding triggered task may also be executed (rather than in the next work cycle). In another example, the same task may be repeated following each triggering event. For example, two audits may be performed on the eleventh date 296, corresponding to two separate transactions that occurred on that date. However, in other implementations, following a day in which a transaction occurred, the task can be executed a single time, regardless of how many transactions took place.

In addition, in different implementations, the cyclically scheduled task can be configured to accommodate a dynamically deferred performance of the task executed in response to a detection of a transaction, and re-start the work-cycle from the date of the most recently executed task. In other words, in some implementations, the pre-selected (i.e., dynamically determined) number of cycles (e.g., 4) that must occur between each cyclically scheduled execution must only include a sequence of consecutive cycles in which the job was not otherwise performed (i.e., in response to a transaction). This is shown in FIG. 2, where following the execution of the task on the first date 210, the system was otherwise configured to perform the task again on a thirteenth date 212. However, because a transaction was detected on the ninth date 290, and a task therefore was executed in the next work cycle (tenth date 292), the performance of the cyclically scheduled tasks was in effect "re-set". Thus, between each cyclically scheduled performance of the task, there is always four days, even though event triggered executions may occur at any time. Furthermore, in different implementations, if a task is scheduled to be cyclically performed (for example, on the fourth day or work-cycle) and a triggering event also occurs on that day, the task need only be performed once during the next work cycle to accommodate the intersection of a cyclically scheduled execution and a conditionally triggered execution.

Figure 3:
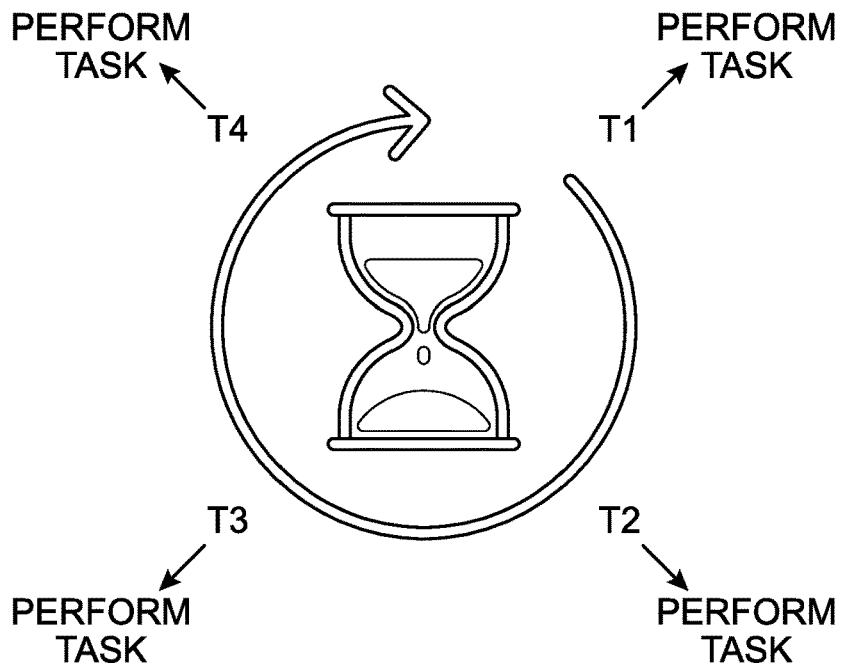
FIG. 3 is a schematic illustration of an implementation of a static schedule for the execution of a recurring task.
Figure 4:
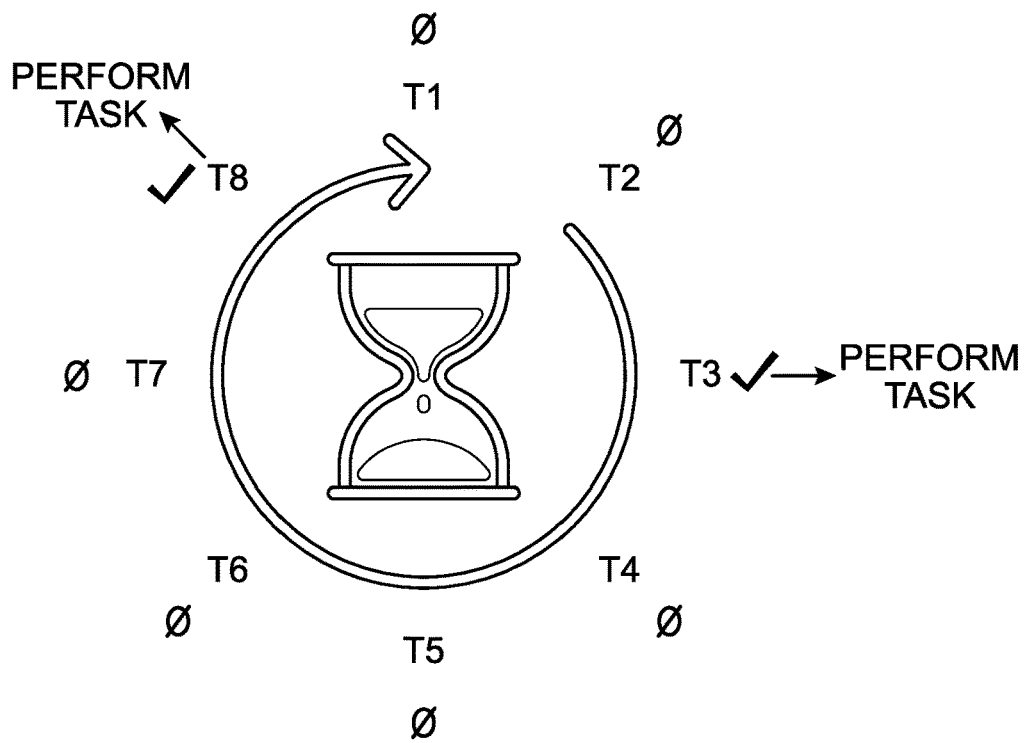
FIG. 4 is a schematic illustration of an implementation of a dynamic schedule for the execution of a recurring task.

For purposes of clarity, FIG. 3 depicts an example of a static schedule and FIG. 4 depicts an example of a dynamic schedule. In FIG. 3, the job has been scheduled to occur every next work-cycles. Thus, at times T1, T2, T3, and T4, the designated task is performed. The task will be performed regardless of whether there is underlying activity in the account(s) or other triggering event. In contrast, FIG. 4 represents a dynamically deferred schedule, where the task only occurs in response to or following the occurrence of a triggering event (here symbolized by a check mark). Thus, when the designated event does occur during a work-cycle, the task will be performed at the next cycle (times T3 and T8). However, during work-cycles where no triggering event has occurred in the previous cycle (T1, T2, T4, T5, T6, T7), the task is not executed.

Figure 5:
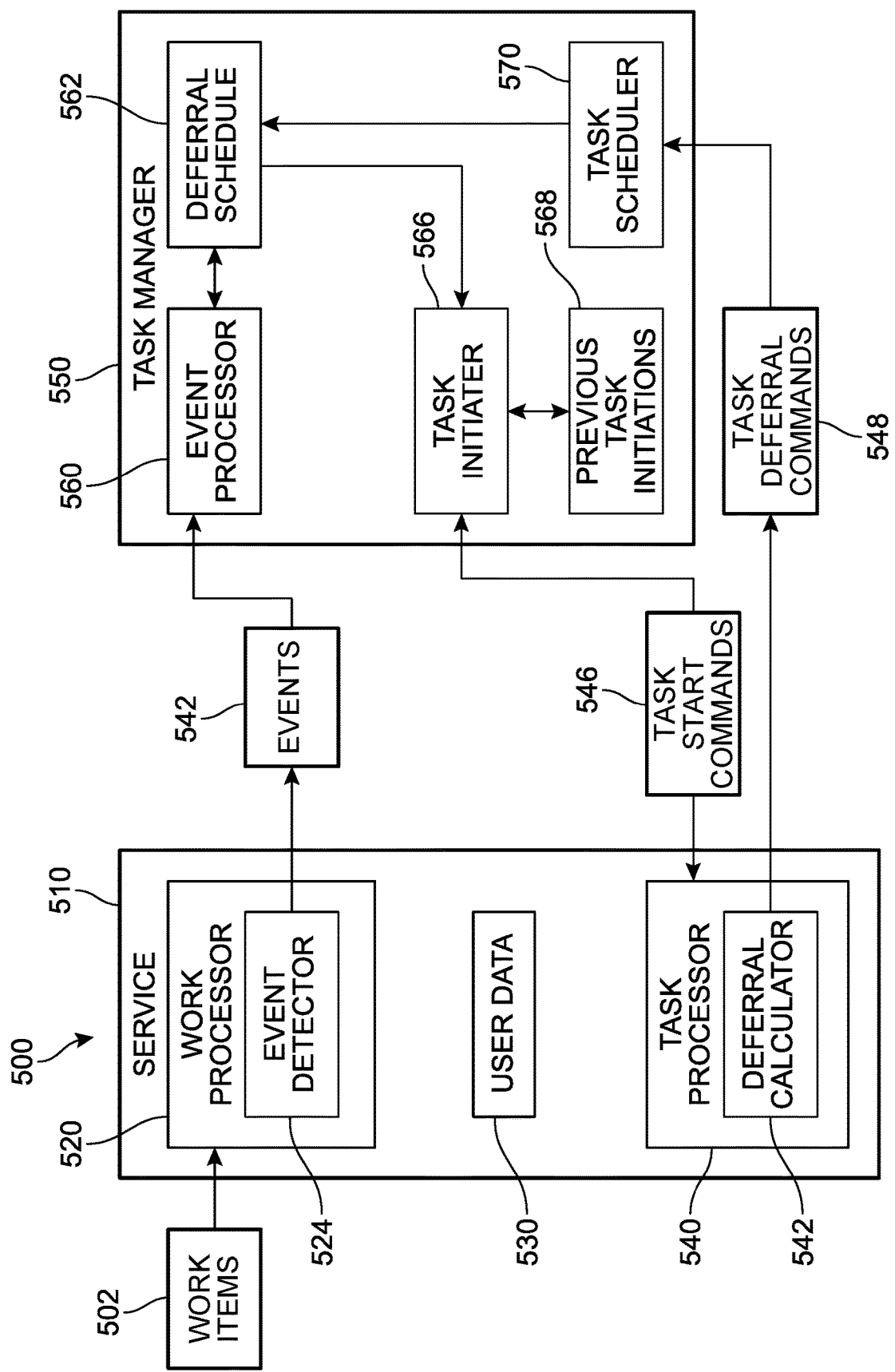
FIG. 5 is an illustration of a system diagram for implementing a dynamic deferral system.

Further information regarding the proposed system is presented with respect to the diagram of FIG. 5. The system 500 includes a service 510 that includes a work processor 520 configured to process work items 502 in association with a plurality of users of the service 510. The system 510 is configured to maintain user data 530 and process received work items 502 based on the user data 530. In some examples, a portion of the user data 530 may be added, removed, and/or modified in the course of processing of received work items 502 by the work processor 520. In some implementations, the service 510 is configured to generate some or all of the work items 502. In a first illustrative example, the service 510 provides an email service, the work items 502 are emails (which may be referred to as "email work items") addressed to users of the service 510, and the service 510 is configured to process received email work items 502 for storage in, and retrieval from, appropriate user mailboxes included in the user data 530. In a second illustrative example, the service 510 provides a customer order processing service, the work items 502 are customer orders (which may be referred to as "order work items"), the users of the service 510 include both customers (who place the orders) and merchants (who fulfill the orders), and the service 510 is configured to track the order work items 502 and provide various order-related functions to customers (for example, payment and shipment tracking functions) and merchants (for example, invoicing, payment, inventory, and shipping functions). It is noted that although FIG. 5 shows only one service 510, the system 500 may include one or more additional such services. In some examples, a single user may be associated with multiple such services.

In FIG. 5, the service 510 includes a task processor 540 configured to automatically and repeatedly perform a recurring first operation on the user data 530 in association with multiple users. The first operation may be referred to as a "batch job" or a "job," the processing of the user data 530 performed by the first operation may be referred to as "batch processing," and each occurrence of the first operation may be referred to as a "batch run." A period of time between successive occurrences of the first operation is referred to as a "work-cycle." In some examples, the work processor 520 is configured to perform real time and/or near-real time processing of work items 502; in contrast, the first operation performed by the task processor 540 occurs less frequently. In some examples, the task processor 510 performs the first operation according to a predetermined schedule. For example, the first operation may be performed once each day (and accordingly have a work-cycle of one day), As another example, the first operation may be performed at or about a same time each day (and accordingly have a 24 hour work-cycle). Although in some examples the schedule may be periodic and each work-cycle is a same amount of time, in other examples amounts of time for work cycles may vary (for example, where the first operation is only performed on business days, the work-cycle may vary from only one day (between business days), to three or more days (due to a weekend and/or holiday).

It is noted that although FIG. 5 shows only one task processor 540 included in the service 510, the service 510 and/or the system 500 may include one or more additional such task processors. In some implementation, the system 500 includes one or more such task processors configured to interoperate with the service 510 but not included in the service 510. By way of example, for the customer order processing service described above, the service 510 may include a first task processor be configured to perform operations in connection with customer users (for example, issuing product recommendation emails to customer users based on their previous orders) and a second task processor configured to perform operations in connection with merchant users (for example, generating a weekly or monthly report of sales). In some examples, a task processor 510 is configured to perform multiple different operations on the user data 530, according to a common schedule and/or different schedules.

Rather than simply performing the first operation for all of the users in the user data 530, the task processor 540 is configured to, on a per-user basis, defer performing the operation by selected numbers of work cycles. In the example shown in FIG. 5, the task processor 540 includes a deferral calculator 542 which is configured to generate one or more task deferral commands 548, which are sent to a task scheduler 570 included in a task manager 550. In some examples, the task deferral commands 548 are produced during batch runs of the first operation. The task manager 550 is configured to maintain a deferral schedule 562 for a plurality of users and one or more tasks. The task scheduler 570 is configured to, based on the task deferral commands 548, update corresponding portions of the deferral schedule 562.

Figure 6:
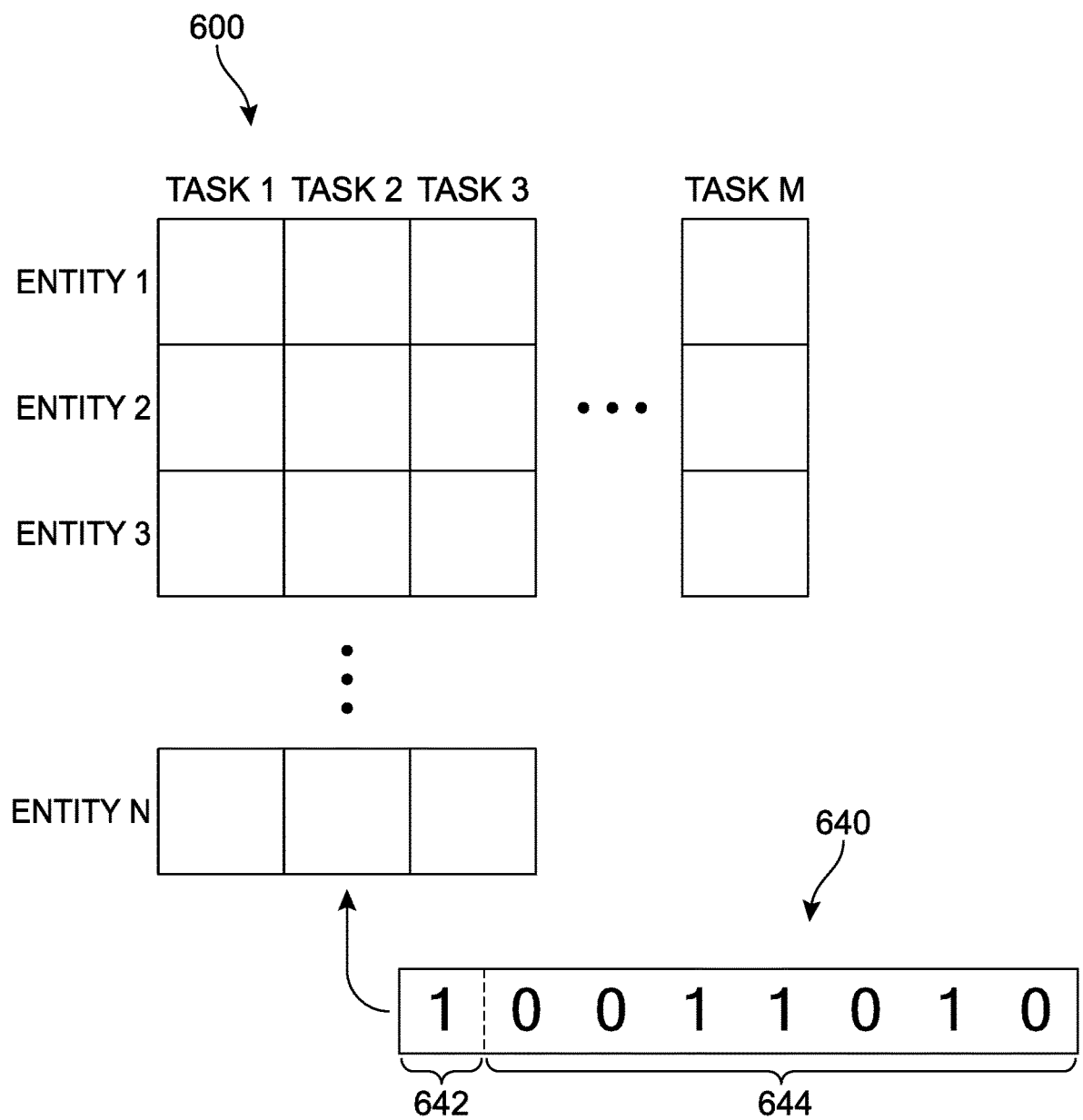
FIG. 6 is an example of a scheduling matrix for achieving an implementation of a dynamic deferral process.

FIG. 6 illustrates an example deferral schedule 600. The deferral schedule 600 maintains and encodes deferrals for a plurality of M tasks (labeled task 1—task M) and N entities (labeled entity 1—entity N). In this example, each of the entities corresponds to a user of one or more services 510, for example users included in the user data 530. In this particular implementation, the deferral schedule 600 encodes, for each combination of a task and entity, deferral parameters 640 as a single byte, in which a triggering event flag 642, which is encoded as a single bit, and a deferral time 644, which is encoded using the remaining seven bits of the deferral parameters 640. By encoding the deferral parameters 640 as a single byte, in some implementations, this allows the deferral schedule 600 and/or a copy of a portion of the deferral schedule 600 to be maintained in a volatile memory of the task manager 550, allowing for more rapid processing of the deferral schedule 600. In FIG. 6, a value of "10011010" is shown for the Task 2 for the Entity N. The least significant 7 bits of this value, which encode the deferral time 644, indicate that the Task 2 should be deferred for the Entity N until 26 work-cycles of the Task 2 after the most recent previous initiation of the Task 2 in association with the Entity N. For example, if daily work-cycles occur for the Task 2, and the Task 2 was last initiated in association with the Entity N on December 1, the deferral time 644 indicates that the Task 2 is to occur on December 27. The value of "1" in the most significant bit, corresponding to the triggering event flag 642, indicates that in response to an event being reported to the task manager 550 for the Task 2 for the Entity N, the deferral time 644 is overridden to "00000001" by event processor 560 which causes the task scheduler 570 perform Task 2 for the Entity N in the next work cycle for the Task 2. As an example, if the Task 2 was performed in association with the Entity N on December 1 and such an event is received between the December 5 and December 6 batch runs of the Task 2, the Task 2 will be performed in association with the Entity N on December 6. This accelerates performing this well ahead of December 29, as would otherwise occur according to the deferral time 644.

Returning to FIG. 5, the task manager 550 includes a task initiator 566 which is configured to, according to the deferral schedule 562 and a record of previous task initiations 568, for various combination of entities and tasks, issue task start commands 546 to task processors 540 for the affected entities to be included in the processing performed in the next work cycle of each of the tasks. The task manager 550 also includes an event processor 560 configured to receive events from the services 510. Each of the received events identifies one or more tasks and one or more entities for which the event has been detected by a service 510. For the tasks and entities that the deferral schedule 562 indicates that such events are to be processed as a trigger to accelerate the deferral, the event processor 560 is configured to indicate, via the deferral schedule 562, to the task initiator 566, that those tasks should be performed for those entities in the next work cycle for each task. In FIG. 5 the work processor 520 includes an event detector 524 configured to, as part of processing the work items 502, detect the occurrence of a triggering event and report such as events 542 to the event processor 560. In some implementations, the task manager 550 may be included in the service 510.

Figure 7:
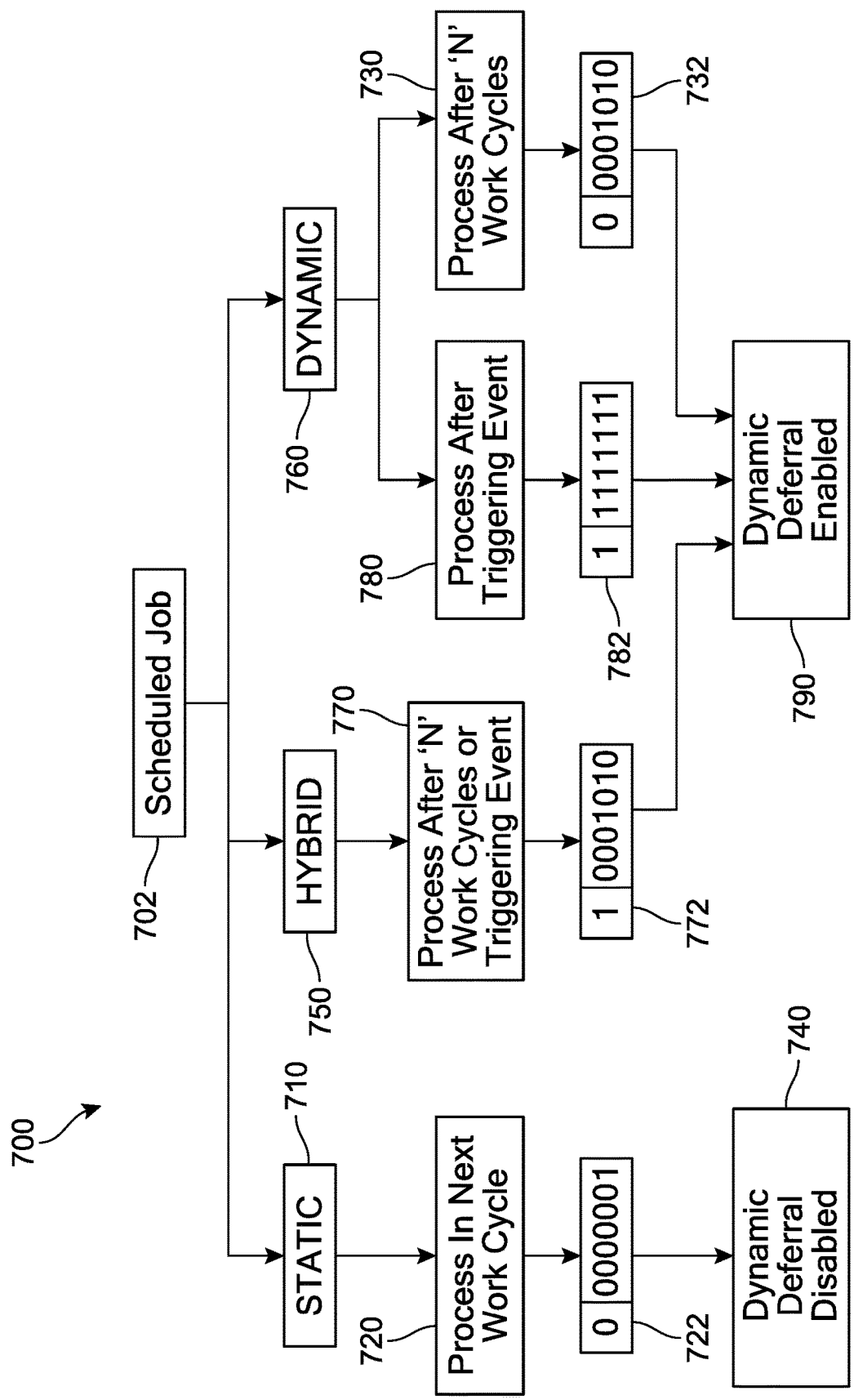
FIG. 7 is a process diagram of an implementation for user customization of annotative tools.

Referring now to FIG. 7, a flow diagram illustrates possible arrangements of a scheduled job matrix. As noted earlier, a scheduling task manager can maintain an "N×M"

matrix where 'N' is the number of entities and M is the number of scheduled jobs. Each cell of the matrix is 1 byte, where the most significant bit of the octet byte represents whether the scheduled job is to be called or initiated if a triggering event occurs for that entity, and the remaining seven bits represent the number of work-cycles the job is to be deferred. As shown in FIG. 7, in cases where a scheduled job 702 is to be statically scheduled 710, the job will be processed in the next work cycle (first configuration 720). Simply for purposes of clarity, a first byte binary representation 722 is depicted for the first configuration 720. It can be observed that the first bit (MSB) for first byte binary representation 722 is designated as '0' or zero. This indicates that dynamic deferral is in a disabled state 740. As represented by the series of binary numbers for the first byte binary representation 722, if the first configuration 720 is chosen, the job is scheduled to occur during the next or subsequent (upcoming) work cycle.

In contrast, in cases where a scheduled job 702 is to be dynamically deferred, the job can be configured for execution per a hybrid approach 750, and processed after some specified number of work cycles and/or a triggering event (a second configuration 770), or via a singular dynamic approach 760, as represented by a third configuration 730 and a fourth configuration 780. As shown in FIG. 7, the third configuration 730 refers to a job whose execution is deferred for "N" number of cycles and the fourth configuration 780 refers to a job that is to be executed only in response to detection of a triggering event.

Thus, where a second byte binary representation 732 is depicted for the third configuration 730, it can be observed that the first bit (MSB) for second byte binary representation 732 is designated as '0' or zero, indicating that the task processor will not execute the task in response to a triggering event. Furthermore, the binary numbers for the second byte binary representation 732 indicate that the job is scheduled to occur after ten work cycles, such that dynamic deferral is in an enabled state 790.

Simply for purposes of clarity, a third byte binary representation 772 is depicted for the second configuration 770, and a fourth byte binary representation 782 is depicted for the fourth configuration 780. It can be observed that the first bit (MSB) for each byte binary representation 772 and 782 is designated as '1' or one. This indicates that the task processor will initiate execution of the task following a triggering event (dynamic deferral is in the enabled state 790). Thus, as represented by the series of binary numbers for the third byte binary representation 772, if the second configuration 770 is chosen, the job is scheduled to occur after ten work cycles or in response to a triggering event, while the binary numbers for the fourth byte binary representation 782 (a sequence of seven '1's) indicate that the job is scheduled to occur only in response to the triggering event. When a potential triggering event occurs, the system reviews the most significant bit for each scheduled job byte binary representation (cell) in the matrix for that entity. If the system finds the most significant bit is set to 1, the system proceeds with evaluating the triggering filters or conditions for that job. If the evaluation returns as 'true', the cell can be marked as 00000001 which represents that it should be picked up in next work cycle. If instead the most significant bit is set to 0, the system ignores that cell.

Figure 8:
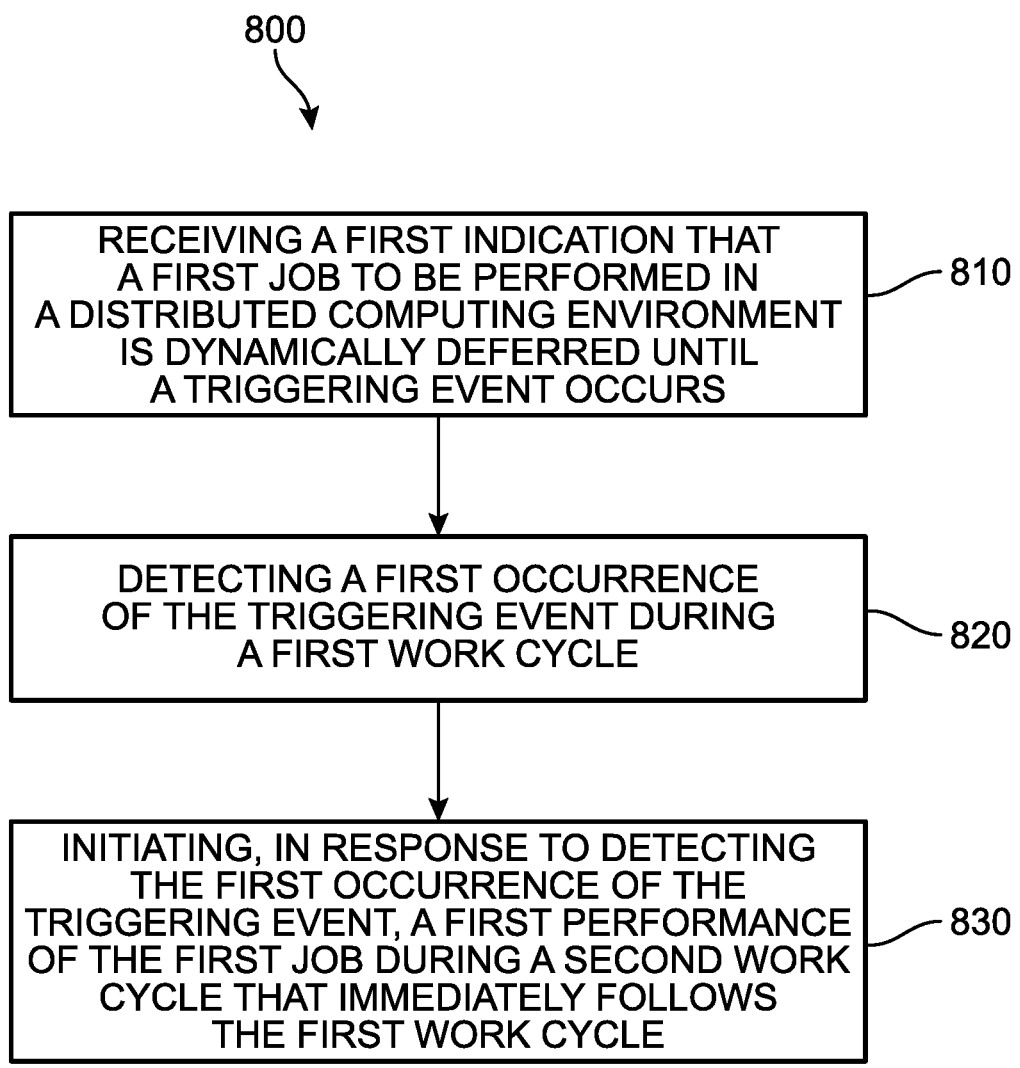
FIG. 8 is a flow diagram illustrating an implementation of a process for sharing and managing annotated electronic content.

FIG. 8 is a flow chart illustrating an implementation of a computer-implemented method 800 for job scheduling in a manner that balances memory usage and task execution. The method 800 includes a first step 810 of receiving a first indication that a first job to be performed in a distributed computing environment is dynamically deferred until a triggering event occurs. The method 800 also includes a second step 820 of detecting a first occurrence of the triggering event during a first work cycle. Furthermore, the method 800 includes initiating, in response to detecting the first occurrence of the triggering event, a first performance or execution of the first job during a second work cycle that immediately follows the first work cycle.

In other implementations, additional steps may be included. For example, in some implementations, the first indication is stored in the most significant bit of a binary representation of a first octet comprising eight bits, where the MSB is set to or is equal to one. In another example, the method may include receiving a second indication that the first job is scheduled to be performed when a sequence comprising a pre-selected or dynamically determined number of work cycles have passed, and then determining a first sequence comprising the dynamically determined number of work cycles has passed. In this case, the first sequence extends from an initial work cycle to a final work cycle. The method can also include initiating, in response to determining that the first sequence has passed, a second performance or execution of the first job during a second work cycle immediately following (i.e., directly subsequent to) the final work cycle.

In different implementations, the initial work cycle occurs immediately following the second work cycle. In one implementation, the first octet includes seven remaining bits that are configured to store information about a dynamically determined schedule for the first job. In another example, the method further includes detecting a second occurrence of the triggering event during a third work cycle, and initiating, in response to detecting the second occurrence of the triggering event, a second performance or execution of the first job during a fourth work cycle that immediately follows the third work cycle. In some cases, the third work cycle and the second work cycle refer to the same work cycle, while in other cases the fourth work cycle is spaced apart from the second work cycle by at least one work cycle. In some implementations, the fourth work cycle is spaced apart from the second work cycle by at least two work cycles (i.e., there must be a work cycle between each task execution event).

In some implementations, each of the eight bits of the first octet are set to or equal to one. In such cases, execution of the first job occurs only in response to detection of the triggering event. In another example, the method may also include a step of receiving a second indication that a second job to be performed in a distributed computing environment is cyclically scheduled, wherein the second indication is represented by a binary representation of a second octet comprising eight bits, where the least significant bit is set to or equal to one and the remaining seven bits of the second octet are set to or equal to zero. In another implementation, the second indication is that the second job be performed dynamically following five work cycles. As an example, the first indication is represented by a stored value set initially to "11111111" indicating that a job should be scheduled only when a triggering event occurs. The second indication can then configured to schedule the job after 5 work cycles or a triggering event occurs by a representation "10000101", where the most significant bit (leftmost bit) is 1 and denotes listening to a triggering event, and the remaining 7 bits represent the decimal number 5.

Thus, as described herein, the dynamic deferral systems and methods provide a means to defer execution of a task by the number of work cycles as well as in response to an occurrence of a triggering event. By deferring the scheduling in terms of the number of work-cycles, the memory footprint is reduced as it uses only one byte to store the number, rather than storing the timestamp of the next processing time, which uses more memory. This approach also takes advantage of the most significant bit of a byte to indicate whether the scheduled job is to be evoked in response to a triggering event.

For the sake of simplicity of description, details are not provided herein for performing various steps. Implementations of the present disclosure can make use of any of the features, systems, components, devices, and methods described in U.S. Patent Publication Number 2013/0179895 to Calder et al., published Jul. 11, 2013 and entitled "Paas hierarchial scheduling and auto-scaling", and U.S. Pat. No. 10,063,491 to Das et al., granted Aug. 28, 2018 and entitled "Dynamic allocation of resources while considering resource reservations", the disclosures of which are herein incorporated by reference in their entirety.

The detailed examples of systems, devices, and techniques described in connection with FIGS. 1-8 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-8 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 9:
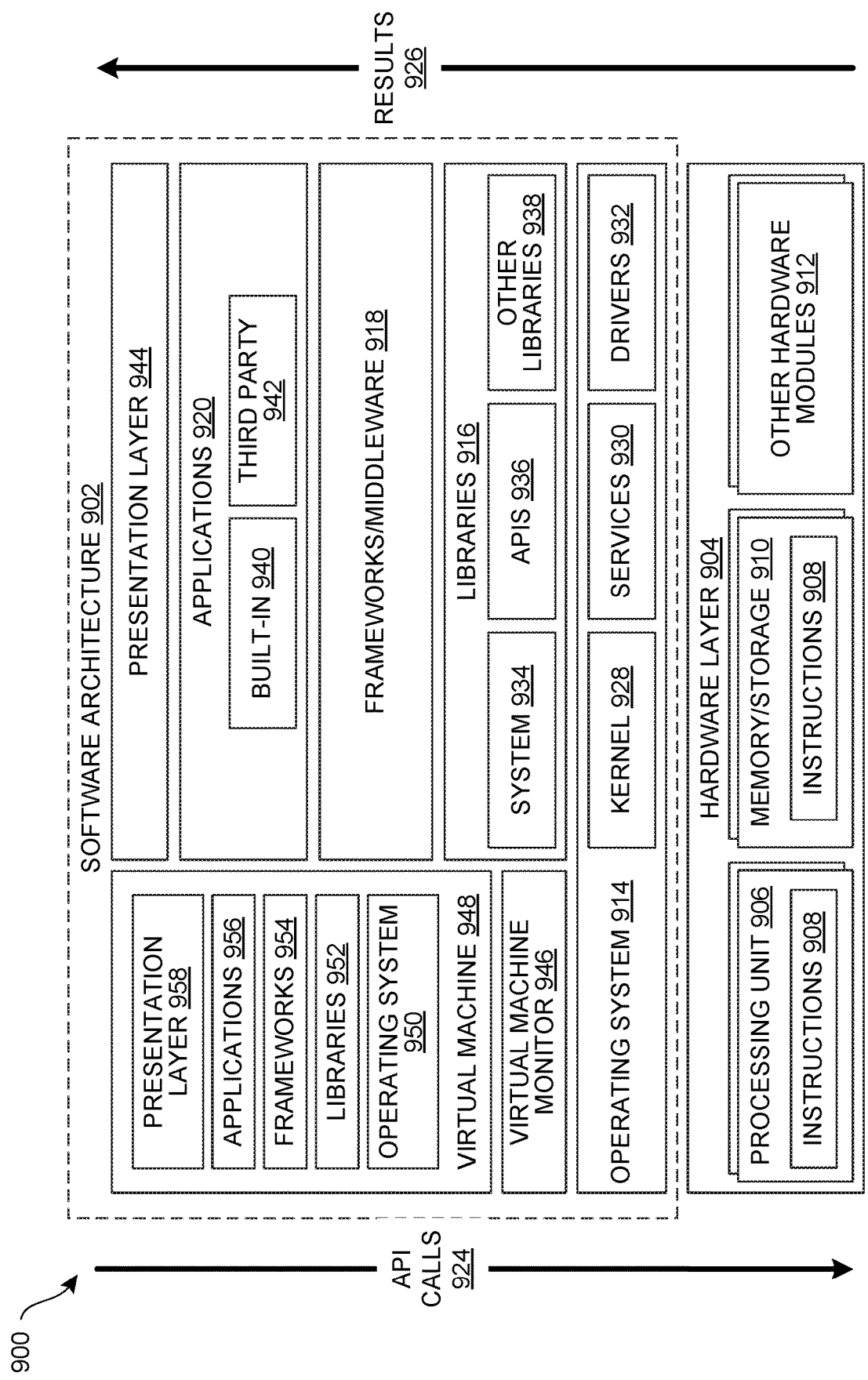
FIG. 9 is a block diagram of an example computing device, which may be used to provide implementations of the mechanisms described herein.

FIG. 9 is a block diagram 900 illustrating an example software architecture 902, various portions of which may be used in conjunction with various hardware architectures herein described, which may implement any of the above-described features. FIG. 9 is a non-limiting example of a software architecture and it will be appreciated that many other architectures may be implemented to facilitate the functionality described herein. The software architecture 902 may execute on hardware such as a device 150 of FIG. 1A that includes, among other things, document storage 1070, processors, memory, and input/output (I/O) components. A representative hardware layer 904 is illustrated and can represent, for example, the device 150 of FIG. 1. The representative hardware layer 904 includes a processing unit 906 and associated executable instructions 908. The executable instructions 908 represent executable instructions of the software architecture 902, including implementation of the methods, modules and so forth described herein. The hardware layer 904 also includes a memory/storage 910, which also includes the executable instructions 908 and accompanying data. The hardware layer 904 may also include other hardware modules 912. Instructions 908 held by processing unit 908 may be portions of instructions 908 held by the memory/storage 910.

The example software architecture 902 may be conceptualized as layers, each providing various functionality. For example, the software architecture 902 may include layers and components such as an operating system (OS) 914, libraries 916, frameworks 918, applications 920, and a presentation layer 944. Operationally, the applications 920 and/or other components within the layers may invoke API calls 924 to other layers and receive corresponding results 926. The layers illustrated are representative in nature and other software architectures may include additional or different layers. For example, some mobile or special purpose operating systems may not provide the frameworks/middleware 918.

The OS 914 may manage hardware resources and provide common services. The OS 914 may include, for example, a kernel 928, services 930, and drivers 932. The kernel 928 may act as an abstraction layer between the hardware layer 904 and other software layers. For example, the kernel 928 may be responsible for memory management, processor management (for example, scheduling), component management, networking, security settings, and so on. The services 930 may provide other common services for the other software layers. The drivers 932 may be responsible for controlling or interfacing with the underlying hardware layer 904. For instance, the drivers 932 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 916 may provide a common infrastructure that may be used by the applications 920 and/or other components and/or layers. The libraries 916 typically provide functionality for use by other software modules to perform tasks, rather than rather than interacting directly with the OS 914. The libraries 916 may include system libraries 934 (for example, C standard library) that may provide functions such as memory allocation, string manipulation, file operations. In addition, the libraries 916 may include API libraries 936 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 916 may also include a wide variety of other libraries 938 to provide many functions for applications 920 and other software modules.

The frameworks 918 (also sometimes referred to as middleware) provide a higher-level common infrastructure that may be used by the applications 920 and/or other software modules. For example, the frameworks 918 may provide various graphic user interface (GUI) functions, high-level resource management, or high-level location services. The frameworks 918 may provide a broad spectrum of other APIs for applications 920 and/or other software modules.

The applications 920 include built-in applications 940 and/or third-party applications 942. Examples of built-in applications 940 may include, but are not limited to, a contacts application, a browser application, a location application, a media application, a messaging application, and/or a game application. Third-party applications 942 may include any applications developed by an entity other than the vendor of the particular platform. The applications 920 may use functions available via OS 914, libraries 916, frameworks 918, and presentation layer 944 to create user interfaces to interact with users.

Some software architectures use virtual machines, as illustrated by a virtual machine 948. The virtual machine 948 provides an execution environment where applications/modules can execute as if they were executing on a hardware machine (such as the machine 1000 of FIG. 10, for example). The virtual machine 948 may be hosted by a host OS (for example, OS 914) or hypervisor, and may have a virtual machine monitor 946 which manages operation of the virtual machine 948 and interoperation with the host operating system. A software architecture, which may be different from software architecture 902 outside of the virtual machine, executes within the virtual machine 948 such as an OS 950, libraries 952, frameworks 954, applications 956, and/or a presentation layer 958.

Figure 10:
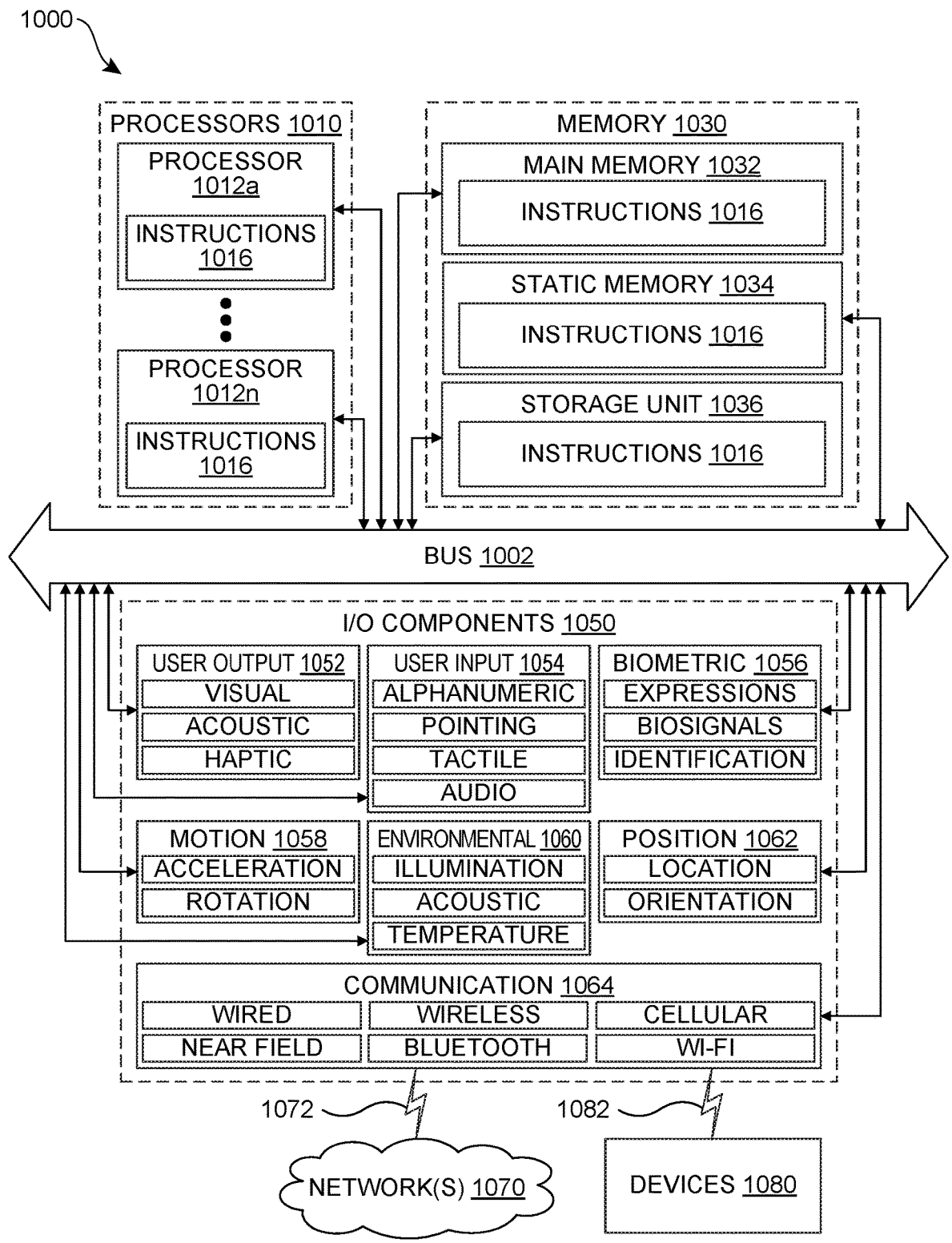
FIG. 10 is a block diagram illustrating components of an example machine configured to read instructions from a machine-readable medium.

FIG. 10 is a block diagram illustrating components of an example machine 1000 configured to read instructions from a machine-readable medium (for example, a machine-readable storage medium) and perform any of the features described herein. The example machine 1000 is in a form of a computer system, within which instructions 1016 (for example, in the form of software components) for causing the machine 1000 to perform any of the features described herein may be executed. As such, the instructions 1016 may be used to implement modules or components described herein. The instructions 1016 cause unprogrammed and/or unconfigured machine 1000 to operate as a particular machine configured to carry out the described features. The machine 1000 may be configured to operate as a standalone device or may be coupled (for example, networked) to other machines. In a networked deployment, the machine 1000 may operate in the capacity of a server machine or a client machine in a server-client network environment, or as a node in a peer-to-peer or distributed network environment. Machine 1000 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1000 is illustrated, the term "machine" includes a collection of machines that individually or jointly execute the instructions 1016.

The machine 1000 may include processors 1010, memory 1030, and I/O components 1050, which may be communicatively coupled via, for example, a bus 1002. The bus 1002 may include multiple buses coupling various elements of machine 1000 via various bus technologies and protocols. In an example, the processors 1010 (including, for example, a central processing unit (CPU), a graphics processing unit (GPU), a digital signal processor (DSP), an ASIC, or a suitable combination thereof) may include one or more processors 1012a to 1012n that may execute the instructions 1016 and process data. In some examples, one or more processors 1010 may execute instructions provided or identified by one or more other processors 1010. The term "processor" includes a multi-core processor including cores that may execute instructions contemporaneously. Although FIG. 10 shows multiple processors, the machine 1000 may include a single processor with a single core, a single processor with multiple cores (for example, a multi-core processor), multiple processors each with a single core, multiple processors each with multiple cores, or any combination thereof. In some examples, the machine 1000 may include multiple processors distributed among multiple machines.

The memory/storage 1030 may include a main memory 1032, a static memory 1034, or other memory, and a storage unit 1036, both accessible to the processors 1010 such as via the bus 1002. The storage unit 1036 and memory 1032, 1034 store instructions 1016 embodying any one or more of the functions described herein. The memory/storage 1030 may also store temporary, intermediate, and/or long-term data for processors 1010. The instructions 1016 may also reside, completely or partially, within the memory 1032, 1034, within the storage unit 1036, within at least one of the processors 1010 (for example, within a command buffer or cache memory), within memory at least one of I/O components 1050, or any suitable combination thereof, during execution thereof. Accordingly, the memory 1032, 1034, the storage unit 1036, memory in processors 1010, and memory in I/O components 1050 are examples of machine-readable media.

As used herein, "machine-readable medium" refers to a device able to temporarily or permanently store instructions and data that cause machine 1000 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1016) for execution by a machine 1000 such that the instructions, when executed by one or more processors 1010 of the machine 1000, cause the machine 1000 to perform and one or more of the features described herein. Accordingly, a "machine-readable medium" may refer to a single storage device, as well as "cloud-based" storage systems or storage networks that include multiple storage apparatus or devices.

The I/O components 1050 may include a wide variety of hardware components adapted to receive input, provide output, produce output, transmit information, exchange information, capture measurements, and so on. The specific I/O components 1050 included in a particular machine will depend on the type and/or function of the machine. For example, mobile devices such as mobile phones may include a touch input device, whereas a headless server or IoT device may not include such a touch input device. The particular examples of I/O components illustrated in FIG. 10 are in no way limiting, and other types of components may be included in machine 1000. The grouping of I/O components 1050 are merely for simplifying this discussion, and the grouping is in no way limiting. In various examples, the I/O components 1050 may include user output components 1052 and user input components 1054. User output components 1052 may include, for example, display components for displaying information (for example, a liquid crystal display (LCD) or a projector), acoustic components (for example, speakers), haptic components (for example, a vibratory motor or force-feedback device), and/or other signal generators. User input components 1054 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1050 may include biometric components 1056 and/or position components 1062, among a wide array of other environmental sensor components. The biometric components 1056 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1062 may include, for example, location sensors (for example, a Global Position System (GPS) receiver), altitude sensors (for example, an air pressure sensor from which altitude may be derived), and/or orientation sensors (for example, magnetometers).

The I/O components 1050 may include communication components 1064, implementing a wide variety of technologies operable to couple the machine 1000 to network(s) 1070 and/or device(s) 1080 via respective communicative couplings 1072 and 1082. The communication components 1064 may include one or more network interface components or other suitable devices to interface with the network(s) 1070. The communication components 1064 may include, for example, components adapted to provide wired communication, wireless communication, cellular communication, Near Field Communication (NFC), Bluetooth communication, Wi-Fi, and/or communication via other modalities. The device(s) 1080 may include other machines or various peripheral devices (for example, coupled via USB).

In some examples, the communication components 1064 may detect identifiers or include components adapted to detect identifiers. For example, the communication components 1064 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1062, such as, but not limited to, geo-location via Internet Protocol (IP) address, location via Wi-Fi, cellular, NFC, Bluetooth, or other wireless station identification and/or signal triangulation.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A data processing system comprising:
   a processor;
   a volatile memory; and
   computer readable media including instructions which, when executed by the processor, cause the processor to:
      receive a first indication that a first job is deferred until a triggering event occurs;
      responsive to receiving the first indication:
         create, in a deferral schedule in the volatile memory, a first entry associated with the first job, wherein the first entry comprises a first octet of bits;
         set one bit, of the first octet of bits, indicating that the first job is to be deferred until the triggering event occurs; and
         set remaining bits, of the first octet, indicating a number of work cycles that the first job is to be deferred until the triggering event occurs;
      during a first work cycle, detect a first occurrence of the triggering event, wherein the first work cycle begins immediately following the completion of the number of work cycles; and
      execute, in response to detecting the first occurrence of the triggering event and based on the deferral schedule, the first job by at least one virtual machine during a second work cycle that immediately follows the first work cycle.

2. The data processing system of claim 1, wherein to set the one bit of the first octet, the instructions further cause the processor to:
   set the one bit as a most significant bit of the first octet to one.

3. The data processing system of claim 2, wherein:
   each of the eight bits of the first octet are equal to one.

4. The data processing system of claim 1, wherein the instructions further cause the processor to:
   receive a second indication that the first job is scheduled to be performed when executed by the at least one virtual machine after a second number of work cycles have passed;
   determine that the second number of work cycles has passed, wherein the second number of work cycles extends from an end of the second work cycle to an end of a final work cycle; and
   initiate, in response to determining that the second number of work cycles has passed, a second execution of the first job during a third work cycle immediately following the final work cycle.

5. The data processing system of claim 1, wherein the instructions further cause the processor to:
   detect a second occurrence of the triggering event during a third work cycle that immediately follows the second work cycle; and
   initiate, in response to detecting the second occurrence of the triggering event, a second execution of the first job during a fourth work cycle that immediately follows the third work cycle.

6. The data processing system of claim 5, wherein the fourth work cycle is spaced apart from the second work cycle by at least two work cycles.

7. The data processing system of claim 1, wherein the instructions further cause the processor to:
   receive a second indication that a second job is statically scheduled, wherein the second indication is represented by a binary representation of a second octet comprising eight bits, and wherein a least significant bit is equal to one and the remaining seven bits of the second octet are equal to zero.

8. The data processing system of claim 1, wherein the first job comprises a collection of tasks working together to execute a distributed computation, the tasks being configured to execute on the at least one virtual machine, the at least one virtual machine being in a distributed computing environment.

9. A method implemented in a data processing system comprising:
receiving a first indication that a first job is deferred until a triggering event occurs;
responsive to receiving the first indication:
creating, in a deferral schedule in a volatile memory, a first entry associated with the first job, wherein the first entry comprises a first octet of bits;
setting one bit, of the first octet of bits, comprising the first entry indicating that the first job is to be deferred until the triggering event occurs; and
setting remaining bits, of the first octet, indicating a number of work cycles that the first job is to be deferred until the triggering event occurs;
during a first work cycle, detecting a first occurrence of the triggering event, wherein the first work cycle begins immediately following the completion of the number of work cycles; and
executing, in response to detecting the first occurrence of the triggering event and based on the deferral schedule, the first job by at least one virtual machine during a second work cycle that immediately follows the first work cycle.

10. The method of claim 9, wherein setting the bit of the first octet comprises setting a most significant bit of the first octet to one.

11. The method of claim 10, wherein:
each of the eight bits of the first octet are equal to one.

12. The method of claim 9, further comprising:
receiving a second indication that the first job is scheduled to be executed by the at least one virtual machine after a second number of work cycles have passed;
determining that the second number of work cycles has passed, wherein the second number of work cycles extends from an end of the second work cycle to an end of a final work cycle; and
initiating, in response to determining that the second number of work cycles has passed, a second execution of the first job during a third work cycle immediately following the final work cycle.

13. The method of claim 9, further comprising:
detecting a second occurrence of the triggering event during a third work cycle that immediately follows the second work cycle; and
initiating, in response to detecting the second occurrence of the triggering event, a second execution of the first job during a fourth work cycle that immediately follows the third work cycle.

14. The method of claim 13, wherein the fourth work cycle is spaced apart from the second work cycle by at least two work cycles.

15. The method of claim 9, further comprising:
receiving a second indication that a second job is statically scheduled,
wherein the second indication is represented by a binary representation of a second octet comprising eight bits, and wherein a least significant bit is equal to one and the remaining seven bits of the second octet are equal to zero.

16. The method of claim 9, wherein the first job comprises a collection of tasks working together to execute a distributed computation, the tasks being configured to execute on the at least one virtual machine, the at least one virtual machine being in a distributed computing environment.

* * * * *